United States Patent

[11] 3,561,643

| [72] | Inventor | Gerald P. Kloven |
| | | White Bear Lake, Minn. |
| [21] | Appl. No. | 759,853 |
| [22] | Filed | Sept. 16, 1968 |
| [45] | Patented | Feb. 9, 1971 |
| [73] | Assignee | Ramsey Engineering Company |
| | | St. Paul, Minn. |
| | | a corporation of Minnesota |

[54] FEEDER FOR PARTICULATE MATERIAL, HAVING MEANS RESPONSIVE TO THE RATE OF FLOW
15 Claims, 6 Drawing Figs.

[52] U.S. Cl. ............................................. 222/55,
222/240, 222/333; 73/228
[51] Int. Cl. .................................................. B67d 5/08
[50] Field of Search ........................................... 222/55, 56,
76, 239, 241, 240, 242; 73/194; 198/37—39; 222/55,
56, 239—242, 333

[56] References Cited
UNITED STATES PATENTS
1,944,447  1/1934  McVicker ..................... 222/239

| 2,276,383 | 3/1942 | Francis.......................... | 222/55 |
| 3,036,769 | 5/1962 | Goslin et al.................... | 222/55X |
| 3,193,155 | 7/1965 | Hazen ........................... | 222/240X |
| 3,303,967 | 2/1967 | Munson.......................... | 222/55X |
| 3,412,699 | 11/1968 | Culp et al. .................... | 222/55X |

Primary Examiner—Stanley H. Tollberg
Assistant Examiner—H. S. Lane
Attorney—Dugger, Peterson, Johnson & Westman ABSTRACT: A gravity-type feeder apparatus for feeding particulate material from a storage bin including a first member having agitator and valve means rotating about an upright axis to provide a valving action for discharging material from the bin, and a second member for receiving the material as it discharges from the first member and including means to weigh the material. Means to provide a signal corresponding to the speed of movement of the feeding apparatus are included so that by combining the weight signal and the speed signal a signal indicating the rate of discharge of material from the bin is received. The rate signal can be used for determining whether a correct amount of material is being fed, and control means are provided for making proper adjustments to the rate of feed.

PATENTED FEB 9 1971
3,561,643
SHEET 1 OF 3
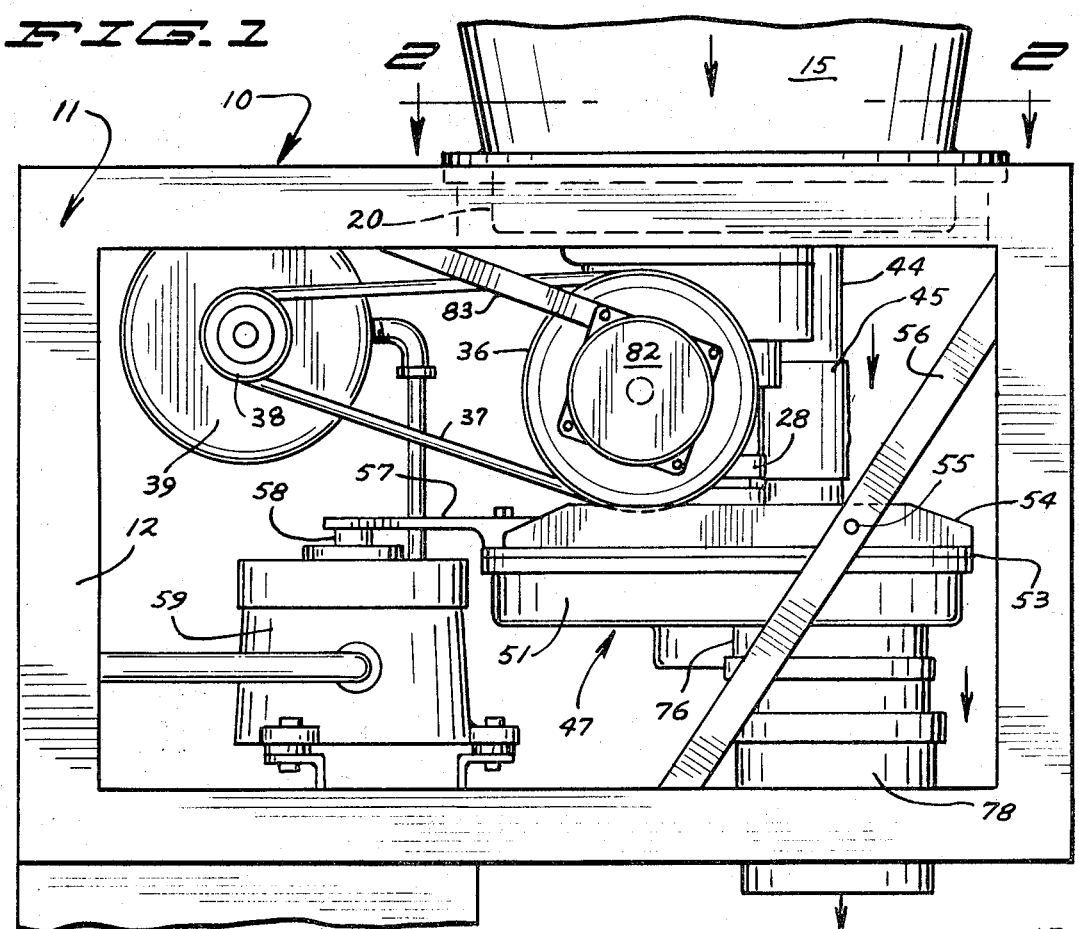
FIG. 1
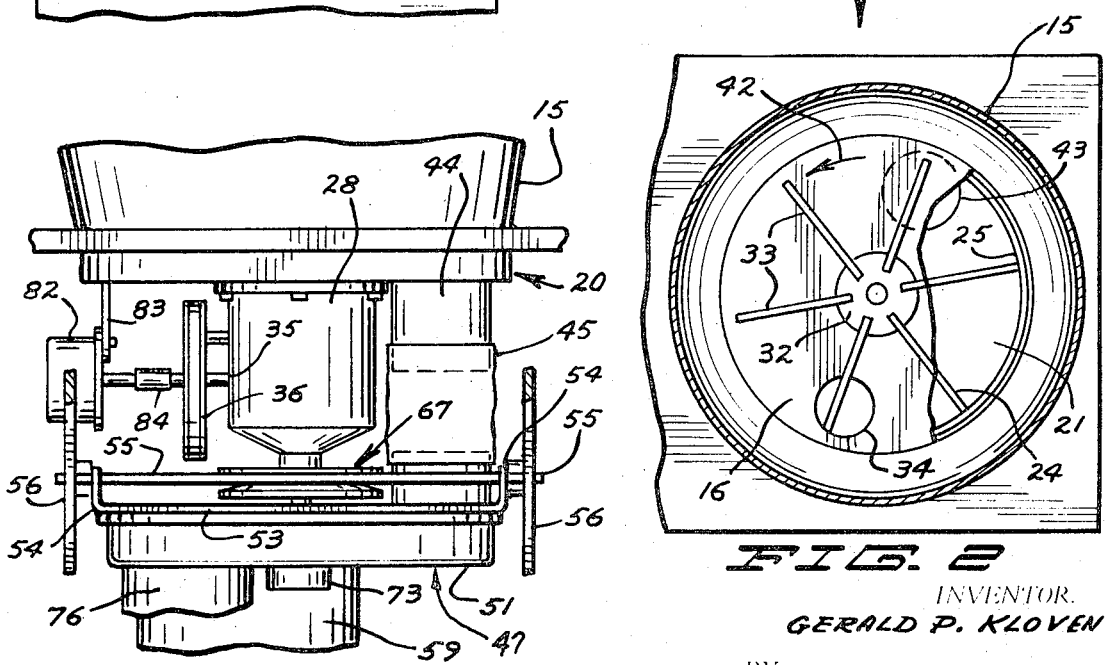
FIG. 3
FIG. 2
INVENTOR.
GERALD P. KLOVEN
BY
Dugger, Peterson, Johnson & Westman
ATTORNEYS

INVENTOR.
GERALD P. KLOVEN

FEEDER FOR PARTICULATE MATERIAL, HAVING MEANS RESPONSIVE TO THE RATE OF FLOW

BACKGROUND OF THE INVENTION

1. Field of the Invention

The invention relates to apparatus for feeding material from storage bins.

2. Prior Art

The gravity feeding of particulate or granular material from storage bins has long been a problem, particularly when the material is extremely fine. The problem is further complicated where the fine material has to be supplied into a continuous process because unless the feeding is even, and known, the correct proportions of the material will not be added to the process. Prior art devices have generally proved to be unsatisfactory, particularly in continuous flow processes because of difficulties in obtaining a true rate of feed signal; because of bridging of materials in the bins; and because of difficulty in changing the feed rate rapidly.

SUMMARY OF THE INVENTION

The present invention relates to a bin feeder having a first feeder including an agitator inside the bin which feeds material to an outlet opening, and into a valved housing that controls the material flow. A second unit or feeder is utilized which comprises a housing having a rotating element for moving material from an inlet to an outlet and which is mounted so that the weight of the material in the second unit is sensed by a load cell or weight transducer as the material moves from the inlet to the outlet. The rate of rotation of the second unit is sensed, and the weight is sensed, and these two signals are combined to give a rate of flow of material being dispensed which is highly accurate. If the rate of flow is not the desired amount, the speed of rotation of the second unit can be changed to adjust this rate.

The second unit comprises a housing pivotally mounted about an axis transverse to the axis of rotation which is situated to make sure that a maximum weight signal is generated from the material inside the housing. The housing itself is isolated to avoid torque or moment force about its pivotal axis, which would result in an erroneous force to the load cell.

The weight of the material in the bin does not bear at all on the material entering the weighing device so that the bin weight does not affect the weight reading regardless of the quantity of material in the supply bin.

The rotating feeder elements are positioned so that there is substantially no friction between the moving parts, and the entire structure is made to minimize cost of construction and operation but enhance accuracy of results.

Therefore, it is an object of the present invention to present a valve for the bottoms of bins which permits regulating feeding of material from the bin.

It is a further object of the present invention to present a weighing device for receiving regulated amounts of material and weighing the material as it is discharged.

It is a further object of the present invention to combine a bin feeding device and a weighing device with means to provide a signal indicating the rate of flow of material from the bin through the weighing device.

BRIEF DESCRIPTION OF THE DRAWINGS

FIG. 1 is a fragmentary side elevational view of a bin showing a device made according to the present invention installed thereon;

FIG. 2 is a fragmentary sectional view taken as on line 2–2 of FIG. 1;

FIG. 6 is a schematic representation of the device of the present invention together with its control system.

DESCRIPTION OF THE PREFERRED EMBODIMENT

Figure 3:
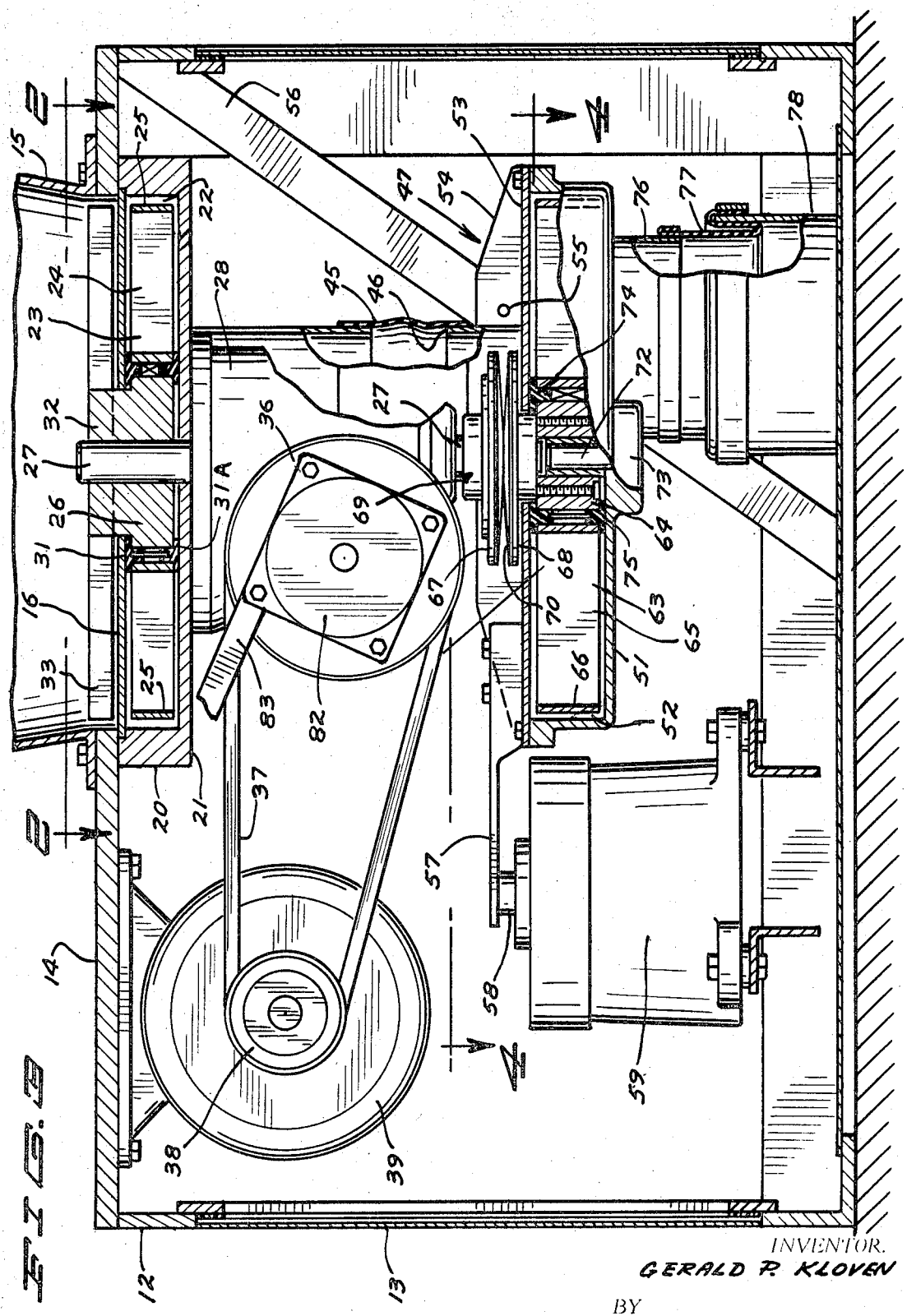
FIG. 3 is a view taken substantially in the same direction as FIG. 1 with parts in section and parts broken away.

The feeding device illustrated generally at 10 is enclosed within a housing 11 having an outer frame 12 and open sides into which panels 13 can be sealingly placed. The panels can be removed for access to the interior, and are removed for sake of clarity in FIG. 1. The entire housing can be sealed from dust. The housing has a top panel 14 on which a hopper 15 is mounted. The hopper 15 can be a portion of a storage bin of large size and volume in which particulate material which is to be metered and measured is placed. The storage hopper can be a bin portion or a chute leading from the large storage bin. The hopper will hold the necessary supply of the particulate material. The hopper 15 has to be sufficiently large in size so that the particulate material will not "bridge" across its wall, or in other words the material has to flow under gravity to a wall 16. As shown, the hopper is slightly conical so that it tapers down toward the wall 16.

The top wall 14 of the housing 11 is used to mount a first section of the feeding device comprising a first feeder-valve assembly illustrated generally at 20. The first feeder 20 comprises an outer housing 21 fastened to the wall 16, and aligned with the center of the hopper section 15. The wall 16 provides a bottom for the hopper section 15 and encloses the housing 21 to form a chamber 22. The chamber 22 is circular, and a rotating feed spider or wheel 23 is mounted therein. The wheel 23 comprises a plurality of radially extending spokes 24 and an annular ring 25 fixed to the outside tips of the spokes.

The spokes 24 extend from a center hub 26. The hub 26 is drivably mounted onto a shaft 27 which forms the output shaft of a gear reducer 28 mounted to the housing 21 and positioned below it. The shaft extends through an opening in the housing. The hub 26 has a neck portion 32 which extends through a provided center opening in the wall 16 and projects into the hopper section. The neck portion 32 is used to mount a plurality of radial agitator vanes 33 (six as shown) and these vanes 33 are positioned above the wall 16 so that they are inside the hopper 15. The vanes extend outwardly and terminate a short distance from the walls of the hopper 15, as shown in FIG. 3, and the bottom edges of the vanes are spaced a short distance above the wall 16. Thus, the vanes 33 do not rub on the upper surface of wall 16.

The wall 16 has an opening 34 defined therethrough so that material can drop through from the hopper 15 into the chamber 22. The vanes 33 overlie the spokes 24 of the feed wheel assembly 23.

The hub of the feed wheel assembly 23 has annular seal members 31 and 31A sealing against the under surface of the wall 16 and the upper surface of the bottom of the housing 21, respectively. Suitable springs spring load the seals 31 and 31A against the respective sealing surfaces.

Figure 5:
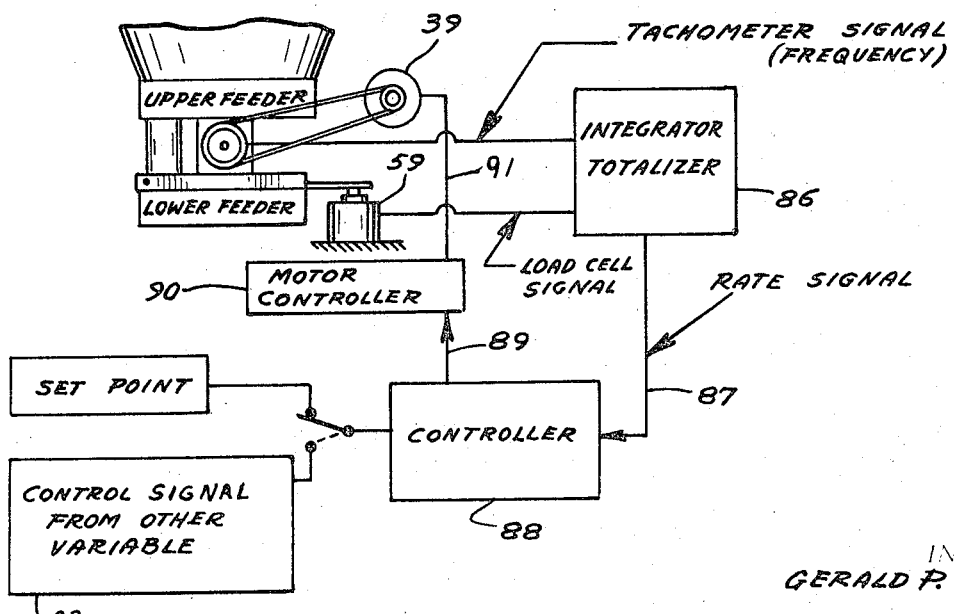
FIG. 5 is a fragmentary end view of the device of FIG. 1.

The gear reducer 28 has an input shaft 35 on which a sheave 36 is drivably mounted (see FIG. 5). The sheave 36 is driven with a V-belt 37 from a sheave 38 on the output shaft of an electric motor 39. The motor 39 is a variable speed motor, and when it is powered, it will drive the belt 37, the sheave 36, and the input shaft 35 of the gear reducer to cause the shaft 27 to rotate in direction as indicated by the arrow 42 in FIG. 2. When this is done, the hub 26 will rotate and drive the vanes 33, as well as the feed wheel 23. This will force granular material falling between the vanes 33 to be moved in the direction indicated by the arrow 42 across the opening 34 and thereby causing the granular material to fall through this opening 34 under gravity into the chamber 22. The material will then be engaged by the spokes 24 of the feed wheel (which is also rotating) and will be carried in the pie-shaped pockets formed by the spokes of this feed wheel in the same direction as that indicated by arrow 42 along the bottom wall of the housing 21 until the material comes to an outlet opening 43 in the bottom wall of the housing 21 (see FIG. 2 where wall 16 is broken away partially). This outlet opening 43 is positioned so that it is tangentially aligned with the inner periphery of the outer wall of the housing 21. The opening 34 is positioned inwardly slightly from the wheel rim 25 so that material dropping through this opening 34 will drop inside the ring 25 on the feed wheel 23 and will be contained within the pockets formed by the feed wheel.

It should also be noted that the spokes or vanes 24 on the feed wheel 23 are spaced both from the bottom wall of the housing and from the bottom surface of the wall 16 so that they do not rub against the walls. The material being conveyed will tend to form a shallow layer between the bottom wall of the housing 21 and the bottom edge of the spokes 24. This material will seal the upper feeder feed wheel, but will not cause high friction or wear.

Thus, the rotating members act in two capacities for metering or feeding the granular material from the hopper 15. First, the vanes 33 act as agitators that keep the material moving, and drive the material across the opening 34 to insure that the material will be dropped from the opening into the chamber 22. Then, the feed wheel assembly 23 including the spokes or vanes 24 and the outer rim 25 act as a valve within the chamber 22 to prevent free flow of material directly from the opening 34 through the chamber 22 and out through the discharge opening 43 of the chamber. The feed wheel 23 thus meters the material coming from the hopper to the discharge opening 43. The openings 34 and 43 are spaced far enough apart angularly, so that there is at least one of the spokes 24 between the openings at all times to act as a valving member. As shown, the openings are substantially 180° apart, and as shown there are at least two spokes between the openings at all times to provide the valving action.

The opening 43 is an opening into a discharge tube 44 which extends downwardly from the housing 21. An extremely flexible sleeve 45, for example made of very thin lightweight rubber which will not transmit axial forces, is slipped over the end of the tube 44, and this sleeve 45 is also slipped over a short tube or neck 46 forming the neck which surrounds an inlet opening leading to a second feeder assembly 47. The second feeder assembly 47 includes a main housing 51, which as shown has a bottom wall and an annular outer wall forming an interior chamber 52. A cover member 53 is mounted onto the housing 51 and the neck 46 is actually integral with the cover member 53.

The cover member 53 is comprised of a flat plate like member having a pair of upstanding ribs 54 on opposite sides thereof. A rod 55 is rotatably mounted through aligning openings in the ribs 54. The rod 55 also is rotatably mounted onto support members 56 mounted on the frame adjacent opposite sides thereof. The rod 55 forms a pivotal axis mounting for the entire feeder assembly 47 which is offset from the upright or center axis of the feeder 47 so that the feeder 47 will tend to rotate about the axis of the rod 55. The tendency of the housing 51 to rotate about this axis is resisted through the use of an arm 57 which is fixedly attached to the cover member 53 and extends outwardly therefrom at substantially right angles to the axis of the rod 55, and out beyond the outer edge of the housing. The arm 57 rests on a sensing knob 58 of a load cell 59. The load cell 59 is used to sense the amount of force exerted by the arm 57 on the knob or button 58. The load cell will provide an electrical signal proportional to this weight.

A feed wheel assembly 63 is rotatably mounted inside the chamber 52 about the same axis as the feed wheel assembly 23. The feed wheel assembly 63 has a center hub 64, and has radially extending spokes or vanes 65 joined to an annular ring 66 forming an outer member. The spoke and ring arrangement of the lower feed wheel is substantially identical to that of the upper feed wheel, except that the spokes 65 of the lower feed wheel are of greater axial length (as shown vertical height) so that the chamber 52 of the lower or second feeder housing has a greater capacity than the chamber of the upper housing. The hub 64 is suitably attached to a coupling assembly 67. The coupling assembly comprises a first member 68 that is attached to the hub 64 with suitable fastening means, and a second member 69 which is attached to the end of shaft 27 protruding from the lower end of the gear reducer 28. The shaft 27 is a through shaft on this gear reducer. The two sections 68 and 69 are joined together with suitable flexible members that will permit torque to be carried on the shaft 27 to the hub 64, but does not transmit any axial forces, within a reasonable amount of movement. This prevents the transmission of axial forces from the shaft 27 to the load cell. The flexible members are shown schematically at 70, and can be any desired flexible member. In actual practice, a pair of light metal annular rings are used. One of the rings is attached to points 180° apart to a first of the coupling sections, the other of the rings is attached in corresponding points to the other of the coupling sections, and then the two rings are attached together at two points 90° offset from the points where these rings are attached to the coupling sections. This gives a very flexible coupling that will transmit sufficient torque for operation, but will not transmit axial forces or loads.

The feed wheel 63 is positioned properly inside the chamber 52 by the use of a stub shaft 72 which is fixedly mounted in a hub 73 on the bottom wall of the housing 51. The hub 64 of the feed wheel is rotatably mounted on the stub shaft 72 on a bushing. The feed wheel 63 also has seal members 74 and 75 on the top and bottom surfaces thereof. These seal members 74 and 75 are annular and are spring loaded so that they will bear against the bottom surface of the cover member 53 and the top surface of the lower wall of the housing 51 to seal off the center portions of the hub from the material being carried by the feed wheel.

When the unit is feeding, the material dropping from the opening 43 through the tube 44 into the collar 46 will drop down into the chamber 52. If the material fluffs up or expands, it will not matter because the lower chamber 52 in the lower housing is of larger capacity than the upper housing. This means that the pockets or sections formed by the spokes 65 (there are six spokes 65 in the lower feed wheel as well) are larger than the pockets of wheel 23 and can handle the material falling into the lower feeder. This material, then, will be carried by the feed wheel 63 (the motor 39 is assumed to be running) in the same direction as that indicated by arrow 42. This will place a greater load in the housing tending to rotate the housing about its pivot on the rod 55, causing a greater reaction through the arm 57 on the button 58 of the load cell and thereby delivering a larger signal from the load cell indicating that a greater weight of material is being carried in the housing. The signal from the load cell is thus a signal that is directly proportional to the weight of the material being carried by the feed wheel assembly 63 in the lower section. Because the flexible sleeve 45 and the flexible members 70 will not carry axial force, the housing will be substantially free to move about the axis of rod 55.

After the material has been carried around the housing a substantial distance, it will be carried by one of the vanes or spokes 65 over and through a discharge opening 79, and thus through a chute 76 connected with a suitable flexible coupling 77 (which also does not restrain movement of the housing) to a delivery chute 78 which will lead to the desired location for the material. For example, the feeder has been found to be extremely effective in feeding bentonite in continuous processes where the bentonite forms a component of other materials. The delivery chute 78 would thus deliver the bentonite to the desired location in the process.

Thus, the combined unit forms a continuous feeding apparatus which not only regulates the flow of material from the hopper 15 through the use of the upper housing, but also weighs the material in a continuous process using the lower housing which is pivotally mounted and which has a load cell to sense the weight of the material being carried through this lower housing.

The rate of feed is obtained by utilizing a tachometer 82 which is mounted onto a bracket 83, and which is coupled through a suitable coupling 84 to the shaft 35 which is the input shaft of the speed reducer. The tachometer will generate an electrical signal that has a frequency proportional to the speed of rotation of the shaft 35 and thus give an indication of how fast the shaft is rotating.

Referring to the schematic diagram in FIG. 6, the signal coming from the tachometer is carried to an integrator-totalizer shown schematically at 86. The totalizer also receives a signal from the load cell 59. The integrator-totalizer combines these two signals, actually multiplying the two electrical signals to give a modulated rate signal on a line 87 leading from the totalizer. This rate signal then can go to its controller mechanism 88. The controller mechanism 88 can be any desired or preferred controller that operates against a set point, so that if the rate signal coming from the totalizer is not at the proper relation to the set point, the controller will change its output signal on a line 89 to a SCR type motor controller 90. The motor controller controls power to motor 39 through a line 91. The totalizer can be of a type shown in the copending application of Gerald P. Kloven, Ser. No. 713,758, filed Mar. 18, 1968. The tachometer signal provides the "-speed" signal. The controller 88 would be driven by the rate signal which drives the rate meter 102 of application Ser. No. 713,758. If the rate of speed is not proper with respect to the set point, the motor 39 will be made to rotate faster or slower, depending on the signal, and in this way the amount of material being fed from the hopper 15 can be changed. The faster the feed wheels rotate, of course, the more material will be carried by them. The more material that is carried results in a greater rate of feed, assuming that the same weight is carried in the lower feeder assembly. If the weight changes in the lower hopper this factor will also be sensed accurately by the load cell to make sure that the proper amount is fed. Alternately, the speed of motor 39 can be controlled in relation to a control signal 93 received from another source that is variable. For example, if the amount of material being fed by feeder 10 is to be proportional to the amount of a second material fed, a signal indicating the amount of the second material fed can be used as a control signal to controller 88. If the amount of the second material changes the signal 93 would change and the speed of motor 39 would change correspondingly.

Figure 4:
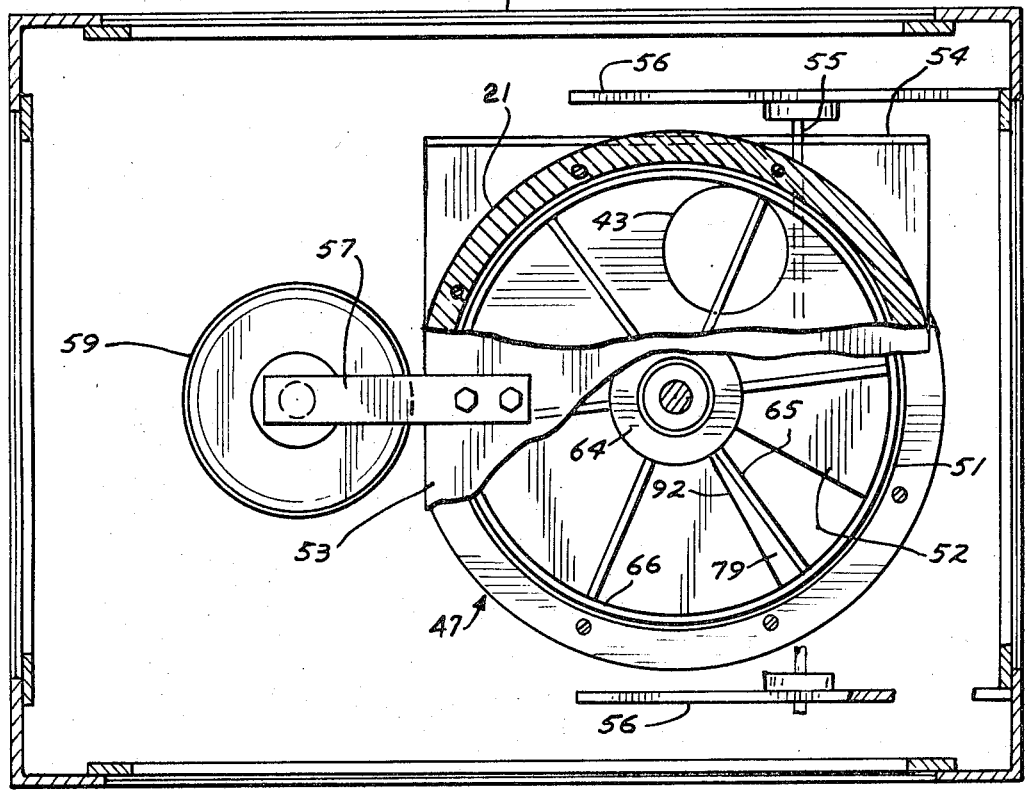
FIG. 4 is a fragmentary view taken as on line 4–4 in FIG. 3.

Referring specifically to FIG. 4, it can be seen that the axis of the rod 55 is positioned so that substantially all of the material being fed by wheel 63 stays on the side of this axis toward the arm 57. The opening 43 in the upper hopper or housing is positioned so that the material dropping into the lower hopper will contact the lower hopper just to the front (considered the side where the arm 57 is as the front) of this axis. Substantially all of the material will fall in the portion of the opening 43 most closely aligned with the axis, keeping the falling material as close to the axis as possible there. Likewise, the positioning of the opening 79 is such that the material will all or substantially all fall out of the chamber 52 on the side of the axis of rod 55 toward the arm 57. The edge 92 of the opening 79 is positioned so that most of the material being carried by the feed wheel 63 falls through this opening on the proper side of the pivot axis.

One of the prime considerations in using a pivoting housing such as is done for the lower feeder-weighing device is to keep the net weight in relation to the tare weight as high as possible. Thus the housing is made of aluminum and other light materials, and the pivot axis is positioned so that the material is carried along a substantial portion of the housing. As can be seen, the material will be carried by the feed wheel in the lower housing over a distance substantially greater than 180° so that a large amount of material will be in the housing causing the weight signal from the load cell to be high in relation to the "no load" signal thereby giving a much more dependable signal. In the lower feeder, as well as in the top feeder, the outlet opening 79 extends outwardly beyond the ring 66 of the feed wheel so that any material reaching the outside of the outer ring will drop through this opening, and the inlet opening to the lower housing is inside the ring to the feed wheel. Further, the spokes or vanes 65 are spaced from the upper surface of the bottom wall of the housing 51 so there is not friction between the vanes and this wall. They are also spaced below the bottom surface of the cover 53. The material being carried will form a seal underneath the spokes 65 between the bottom edge of the spokes 65 and the lower wall of housing 51.

Another feature of keeping the input to the lower feeder-weigher close to the fulcrum or axis of the rod 55 is that the dropping of the material into the lower feeder will not greatly disturb the weight sensed by the load cell. The shock loads caused by this falling action will be absorbed largely in the pin or rod 55 and will not cause great fluctuations in the load cell signal.

The lower feeder is symmetrical about a plane bisecting the feeder and normal to the axis 55 (as shown this plane would pass through arm 57). In other words, there is generally the same amount of material in each side of this bisecting plane. The edge 92 of the outlet opening is positioned properly in relation to the inlet opening to the lower feeder so that this is true.

The present feeding device, in particular the lower portion providing the weight signal is sensitive to changes in density of the material, and is not strictly a volume-type feeder. If the material being transferred changes in density, the feed rate will be changed. For example, if the density lessens, the motor will be speeded up because the weight will be less. If the material becomes more dense, then the motor will be slowed down if the set point is set for a certain number of pounds per hour. It is thus accurate even though the material itself will change density as it is being fed. The basic rate signal is in pounds per hour, because the load cell will sense material in pounds giving the weight signal, and the tachometer senses speed. This will give the necessary signals for a "pounds per hour" signal.

The upper feeder can be used alone as a bin feeder; the lower feeder can be used with any regulated feeder that isolates the weight of material in the bin from the lower feeder, and together the feeders combine into a unit that gives great accuracy and controllability of the feed rate.

The term load cell as used herein actually means a weight transducer, sensitive to and delivering a signal proportional to the weight on the cell.

I claim:

1. A device for feeding material from a bin comprising a first housing, an opening from said bin to said first housing, agitator means to move material through said opening, a feeder member in said first housing comprising a rotatably mounted assembly having a plurality of vanes extending substantially radially outwardly, controllable actuating means for said feeder member, a discharge opening defined in said first housing, said vanes being rotatable to move material from the opening between said bin and said housing to said discharge opening, said vanes being positioned so that there is at least one vane in said first housing between said opening from said bin and said discharge opening, a second housing positioned below said first housing, means to deliver material from the discharge opening of said first housing to said second housing, feed means to transport material in said second housing from a second housing inlet opening to a second housing outlet opening, said second housing outlet opening being spaced from said second housing inlet opening, and means to modulatingly sense the weight of material as it is moved from said second housing inlet opening to said second housing outlet opening to provide signal for controlling said controllable actuating means and consequently the rate of feed from said second housing.

2. The device specified in claim 1 wherein said second housing is mounted about a pivotal axis, and said second housing inlet opening and said second housing outlet opening are positioned with respect to said pivot axis so as to cause material moving in said second housing from said second housing inlet opening to said second housing outlet opening to cause a torque about said pivot axis, and said means to sense the weight of material restraining said housing from moving about said pivotal axis and including a member sensitive to the amount of force necessary to restrain said pivoting.

3. The combination as specified in claim 2 including means to rotate said feed members in said first and second housings at the same rate, and tachometer means to deliver an electrical signal indicating the speed of rotation of said feed means, said means restraining said housing from pivoting about is axis comprising a load cell delivering an electrical signal proportional to the force necessary to restrain such movement, and means to combine the electrical signals to deliver a signal proportional to the rate of feed of material through said housings.

4. The device specified in claim 1 wherein said feed means in said second housing comprises a wheellike member having a hub coaxial with the rotatably mounted assembly in the first housing, a plurality of radially extending vanes attached to said hub, said vanes being of size to pass underneath the inlet opening to said second housing and over the outlet opening from said second housing as they rotate with said hub.

5. The device specified in claim 4 and drive means to the feed means in said second housing including means which will transfer substantially no axial force to said second housing.

6. A device responsive to the rate of flow in weight of a particulate material being fed under gravity from a bin comprising means for delivering material from said bin, a frame, a housing, means to pivotally mount said housing to said frame about an axis, means to transport material from said first mentioned means along a portion of said housing wherein said material exerts a torque on the housing about said axis, said housing having a capacity to transport more material than said means delivering material from said bin can deliver, means to sense torque on the housing about said axis caused by the weight of material being transported in said housing, means to determine the rate of movement of said means transporting material in said housing, and means to combine the two last mentioned means to give a response to said rate of flow.

7. The device specified in claim 6 wherein said housing has a substantially circular center chamber, and wherein said material is dropped into said housing through a top opening thereof, a feed wheel rotatably mounted to said housing and having a plurality of vanes extending outwardly about the axis of rotation thereof, said vanes being adapted to engage material dropping through said top opening into said housing and move said material about the rotational axis of said wheel, and an outlet opening from said housing on the bottom wall thereof, said vanes moving material carried thereby over said outlet opening.

8. The device specified in claim 7 wherein said housing is pivotally mounted about an axis transverse to the axis of rotation of said feed wheel and substantially parallel to the plane of movement of said feed wheel, and said means to sense the weight of material comprising load-sensing means restraining movement of said housing about its pivotal axis.

9. The device as specified in claim 8 wherein said load-sensing means delivers an electrical signal proportional to the force exerted thereon.

10. The device of claim 9 wherein said means to determine the rate of movement of the means transporting material includes tachometer means to deliver an electrical signal, totalizer means to combine the electrical signals from said tachometer means and said load-sensing means to deliver a signal proportional to the feed rate of material being fed through said housing.

11. A gravity-type feeding device for feeding material from a storage bin comprising a first housing having a substantially circular interior chamber positioned below said bin, a rotatable feed wheel inside the interior chamber of said housing, said feed wheel having a hub, a plurality of vanes extending radially from said hub inside the interior chamber of said housing, said hub having a portion thereof extending into said bin, a plurality of radially extending vanes mounted on said hub inside the bin, means forming a passageway between the interior chamber of said housing and said bin, said vanes in said bin being of size to pass over said passageway as said hub rotates, said hub being rotatable about a substantially vertical axis, an outlet opening in the lower side of said housing spaced from the passageway a sufficient angular distance so that at least one of said radial vanes in the feed wheel in said housing is between the passageway between the bin and the housing and the outlet opening, a feed chute leading from said outlet opening substantially vertically downwardly, a second housing positioned below said first housing, said second housing having a substantially circular interior chamber, and a top wall, a second feed wheel rotatably mounted in said second housing about an axis substantially coincidental with the axis of rotation of the feed wheel in said first housing, said second feed wheel having a plurality of spaced radially extending vanes, an inlet opening in the top wall of said second housing positioned below said feed chute, flexible connection means between said inlet opening and said chute, said flexible connection means preventing force transfer between said chute and said second housing, means to pivotally mount said second housing about a pivotal axis substantially parallel to the plane of movement of said second feed wheel and at substantially right angles to the axis of rotation of said second feed wheel, said axis being on a vertical plane adjacent the inlet opening of said second housing, means to rotate said first and second feed wheels about their respective axes, an outlet opening from said second housing in a lower wall thereof and angularly positioned more than 180° from said inlet opening of the second housing when measured in the direction of rotation of said second feed wheel, said pivotal axis being positioned so that material being carried in said second housing by said second feed wheel from said inlet opening and moving toward the outlet opening creates a torque about said pivotal axis, a load cell, and means between said second housing and said load cell which causes the load cell to restrain pivotal movement of said second housing about its pivot axis, said load cell delivering electrical signals proportional to the weight thereon from said second housing.

12. The feeding device of claim 11 and common drive means to rotate said first and second feed wheels, tachometer means to deliver an electrical signal indicating the speed of said first and second feed wheels, totalizer means to combine the electrical signals from said tachometer means and said load cell to deliver a signal proportional to the rate of material being fed through said housing from said bin, and means to adjust the speed of said common drive means in response to differentials in the rate signal from a preselected level.

13. The combination as specified in claim 11 wherein said second feed wheel includes an annular band member connecting the radial vane members, said annular band member being spaced from the peripheral walls of said second housing which defines said interior chamber in said second housing.

14. The combination as specified in claim 13 wherein said outlet opening from said second housing extends radially outwardly farther than said annular band in said second housing.

15. The feeding device of claim 12 and a control signal from a variable which provides a reference to determine the correct level of the rate signal.